May 19, 1925.  1,538,146
D. R. TOOMAY
STORAGE BATTERY
Filed June 4, 1921
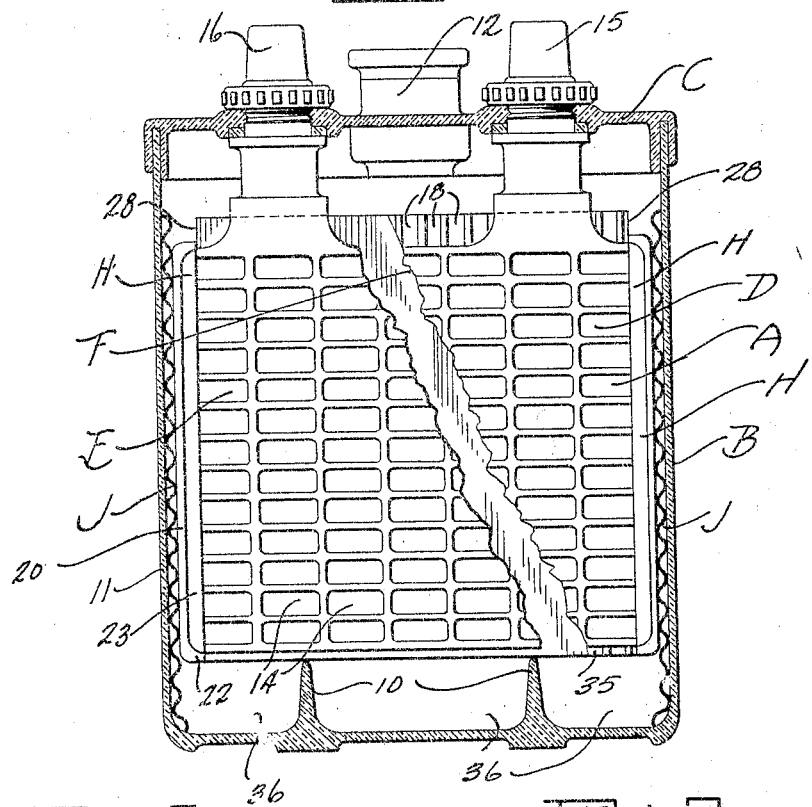
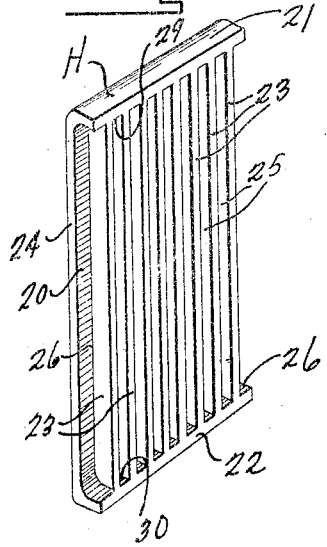
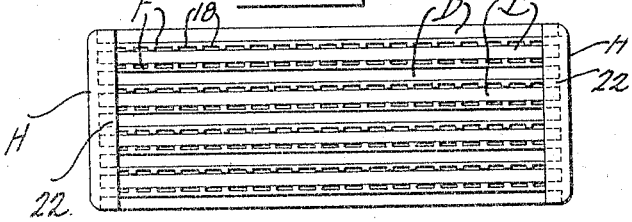
Inventor
David R. Toomay
By Lancaster and Allwine
Attorneys Patented May 19, 1925.

1,538,146

UNITED STATES PATENT OFFICE.

DAVID R. TOOMAY, OF BRAYMER, MISSOURI.

STORAGE BATTERY.

Application filed June 4, 1921. Serial No. 475,053.

*To all whom it may concern:*

Be it known that I, DAVID R. TOOMAY, a citizen of the United States, residing at Braymer, in the county of Caldwell and State of Missouri, have invented certain new and useful Improvements in Storage Batteries, of which the following is a specification.

This invention relates to improvements in storage batteries, being particularly directed to an aligning and projecting device for storage battery plates.

The primary object of the invention is the provision of a device of the above described class, which includes an improved holder of insulating material, for maintaining storage battery plates in fixed and exact relation, to prevent buckling or cutting of separators incident to chafing and vibration, and insuring the battery against "treeing" or formation of metallic deposits between positive and negative plates therein.

A further object of the invention is the provision of a storage battery arrangement including positive and negative plates, with interposed insulating separators; and including holding plates of insulation for secreting the vertical edges of said plates to provide a positive seal or partition intermediate positive and negative plates to prevent clustering of metallic deposits between positive and negative plates.

A further object of the invention is the provision of a device of the above described character, which will permit the use of plates of various metals for practical battery plate construction, and which has heretofore been prohibited by the susceptibility of certain metals to form metallic deposits.

Other objects and advantages will be apparent during the course of the following detailed description.

In the accompanying drawings, forming a part of this specification, and in which similar reference characters designate corresponding parts throughout the several views, Figure 1 is a vertical cross sectional view through a storage battery, showing certain details thereof in fragmentary side elevation.

Figure 2 is a plan view of the improved plate holding means, showing the relation thereof to a plurality of battery plates and their separators.

Figure 3 is a perspective view of an improved plate holder for use in aligning and protecting the storage battery plates.

In the drawing, wherein for the purpose of illustration is shown a preferred embodiment of my invention, the letter A designates a storage battery of standard construction including a cell B, and a cell cover C. The battery A likewise includes positive and negative plates D and E respectively, partitioned from each other by insulating separators F. The improved interlocking plate holder H is adapted for engaging the various plates to maintain the same in spaced relation, to make a rigid structure of said plates in assembled relation. Shims or spacing elements J are provided for contact with the exterior of the holding means H, and for disposition upon the inside of the cell B for maintaining the plates in yieldable position with respect to the cell B.

The cell B and cover C may be of any standard construction to adapt the battery for various uses. The cell B is preferably provided upwardly, interiorly thereof, with the longitudinal bridges 10 extending upon the bottom of the cells and in parallel relation to the sides 11 thereof. A suitable filler cap and vent arrangement 12 is provided upon the top of the cover C as in the ordinary storage battery construction.

The positive and negative plates D and E respectively, may be of any approved construction, either of the formed plate type, or the pasted grid plate type. However, it is preferred that the same be of the approved lead grid type such as is in general use. The plates D and E are of standard construction, having suitable pockets or recesses 14 therein for reception of any material or composition to form a chemical action with an approved electrolyte. Terminal posts or strips 15 and 16 are provided upon the plates D and E respectively, extending upwardly through the cell cover C, as in ordinary construction. The separators F are of course of insulating material, adapted to partition the plates D and E from direct contact. The separators F, are preferably of the chemically treated wood type, and provided with suitable grooves or recesses 18 extending vertically therethrough, for a purpose to be subsequently set forth. It is preferred that the separators F be narrower in width than the plates D and E. Thus, when the separators are disposed intermediate positive and negative plates D and E, the vertical sides of plates D and E project for a short distance from each vertical side of the separators F.

The plate aligning and protecting device H, is preferably formed rectangular, and composed of some insulating material, such as fiber, hard rubber, porcelain or glass. The same is preferably an integral moulded structure, and comprises a flat body plate or disc 20, having the top 21 and bottom 22 thereof overturned in parallel relation to each other. Longitudinal ribs 23 of uniform thickness are provided in spaced relation and parallel with the longitudinal sides 24 of the body 20 extending from the top 21 to the bottom 22 of the holder H, and preferably moulded integral with the top and bottom of the holder. In this manner, pockets 25 are provided intermediate adjacent ribs 23, said pockets being of uniform thickness and length. The outside ribs 23 immediately adjacent the longitudinal sides 24, are formed inwardly of said longitudinal sides, to provide an open pocket arrangement 26 adjacent the outside ribs 23.

Referring to the assemblage of the positive and negative plates D and E, together with their separators F, in the holders H, attention is directed to the above mentioned fact, that the vertical edges of the positive and negative plates project slightly from the ends of the separators F. The plates D and E are assembled in ordinary relation, having a separator F interposed therebetween. The plate locking devices H are adapted for disposition upon the opposite vertical edges of the plates D and E, and in such manner that the vertical edges of the plates D and E, which project outwardly from the separators F, will be disposed within the pockets 25 of said holders. The vertical edges of the plates D and E are adapted for snug fitting in the pockets 25. When assembled in this relation, the vertical outside edges 28 of the separators F will contact with the outside faces of the ribs 23, and fit snugly thereagainst to provide an effective and sealing partition, intermediate adjacent positive and negative plates. The outside plates can, of course, be placed within the open pockets 26 and insulated from their adjacent plates, as clearly illustrated in Figure 2 of the drawing. When assembled in the above described manner, the plates D and E are in predetermined fixed relation with respect to each other, and to the separators F and in such manner that an electrolyte in the battery A may freely pass up and down the grooves 18 in the separators F, for contact with the active faces of the plates D and E. The heights of the plates D and E are uniform and when said plates are assembled in the pocket of the holders H, the tops and bottoms of said plates will contact the inside end surfaces 29 and 30 respectively, of the top and bottom 21 and 22 of the holder H; said inside surfaces 29 and 30 of course, forming part of the pockets 25 and 26. The holders H are positioned upon opposite vertical sides of the plates to form a compact interlocked unitary arrangement.

In placing the unitary arrangement in the battery cell, the outsides of the holders will be spaced from the insides of cell. The flexible or resilient shims J are preferably sinuous in formation and provided as fillers to contact the inside of the cell sides 11, and likewise engaging the outside of the holders H, whereby upon vibration of the battery A, the unitary arrangement of plates will not be injured or injure the cell B. In positioning the unitary arrangement of interlocked plates within the cell B, the same is carefully lowered into said cell, until, the downwardly projecting portions 35 of the various separators F rest upon the bridge pieces 10 of said cell. By this arrangement, the large space or spaces 36 are provided below bottoms of the plates D, for the collection of sediment, such as is apt to be deposited from the positive and negative plates.

From the foregoing description, it can be seen that an arrangement has been provided in which the tops and bottoms of the partition plates F will extend upwardly and downwardly from the extreme top and bottom of the plates D and E, and preventing any liability of "treeing" of metallic deposits, such as is apt to occur from the positive elements toward the negative. "Treeing" or clustering of such metallic depositions is absolutely prevented along the vertical and outside edges of the plates D and E due to the assemblage of said plates in interlocked relation, by the insulating member H. Thus, there will be no liability of short circuiting of electric currents between plates. A detachable arrangement has thus been provided for rigidly locking the plates in a most effective relation.

Various changes in the shape, size and arrangement of parts, may be made to the form of the invention herein shown and described, without departing from the spirit of the invention or the scope of the claims.

I claim:

1. In an aligning and protecting device for storage battery plates, the combination with a storage battery including a cell, plates, and insulating separators, of insulating members having longitudinally extending spaced ribs to provide pockets therein, said pockets adapted to receive lateral sides of said battery plates in snug fitting relation therein, to maintain said plates in spaced relation having the insulator separators intermediate said plates, the lateral sides of said separators adapted to contact the faces of said ribs to effectively partition adjacent plates from each other.

2. As an article of manufacture, a battery plate holder comprising a plate body portion having the upper and lower marginal portions thereof flanged to one side of the plate body portion and having longitudinal ribs thereon in spaced relation at the same side of the plate body portion from which said upper and lower portions are flanged, said ribs connecting said flanges, the spaces intermediate said ribs and the upper and lower flanges providing pockets.

3. A storage battery comprising in combination a cell, plates, detachable holding means for extending vertically along the side edges of the plates and between the side edge portions of the plates for interlocking said plates in a unitary arrangement, and means between the holding means and side walls of the cell for yieldably maintaining said unitary structure in a storage battery.

4. A storage battery comprising in combination a cell, a plurality of positive and negative plates, separators of insulating material adapted for interposition between adjacent positive and negative plates and each having vertically disposed ribs to provide passageways between the separators and certain of said plates, and insulating holders to be disposed at the ends of a bank of plates, said holders having upper and lower flanges and longitudinally extending ribs between the flanges and providing longitudinal pockets, said pockets adapted to receive the vertical edges of said plates, the ribs of said holders adapted to contact with the vertical side edges of said separators to retain the separators against individual movement and effectively partition adjacent plates from each other.

5. A storage battery comprising in combination a cell, battery plates, means engaging the side portions of the plates for interlocking said plates to effectively partition them from short circuit, and means fitting between the last mentioned means and side walls of the cell for yieldably spacing said interlocked plates from the sides of said cells.

6. A storage battery comprising a pair of holders, each of rigid insulating material having the top and bottom thereof flanged over, and provided with longitudinal ribs upon the flanged over side thereof, in order to provide substantially rectangular depressed pockets, battery plates having their lateral edges positioned in secreted manner in said depressed pockets, and insulating means intermediate said battery plates.

7. A storage battery comprising a pair of holders, each of said holders being formed of rigid insulating material and having the top and bottom edges thereof flanged over, said holders each having longitudinal ribs upon the flanged over side thereof and disposed substantially at right angles to the top and bottom flanged edges, said ribs being connected to said edges to provide a plurality of spaced rectangular depressed pockets upon a side of said holder, a plurality of positive and negative plates adapted for having their lateral edges secreted in the depressed pockets of said holders, separators snugly fitting intermediate adjacent positive and negative plates and having their lateral edges contacting with the outside faces of the ribs on said holders to provide a barrier intermediate said plates, said plates and separators having cooperating grooves and depressions therein whereby an electrolyte may pass therebetween for communicating between the positive and negative plates over the top and bottom edges of said separators.

8. A storage battery comprising a cell, battery plates, detachable holding devices upon the sides of said plates for interlocking the plates in a unitary arrangement, and resilient shims of sinuous formation for engaging intermediate the sides of the battery cell and the sides of the holding means for yieldably maintaining said unitary structure in resilient position within the battery.

DAVID R. TOOMAY.